UNITED STATES PATENT OFFICE.

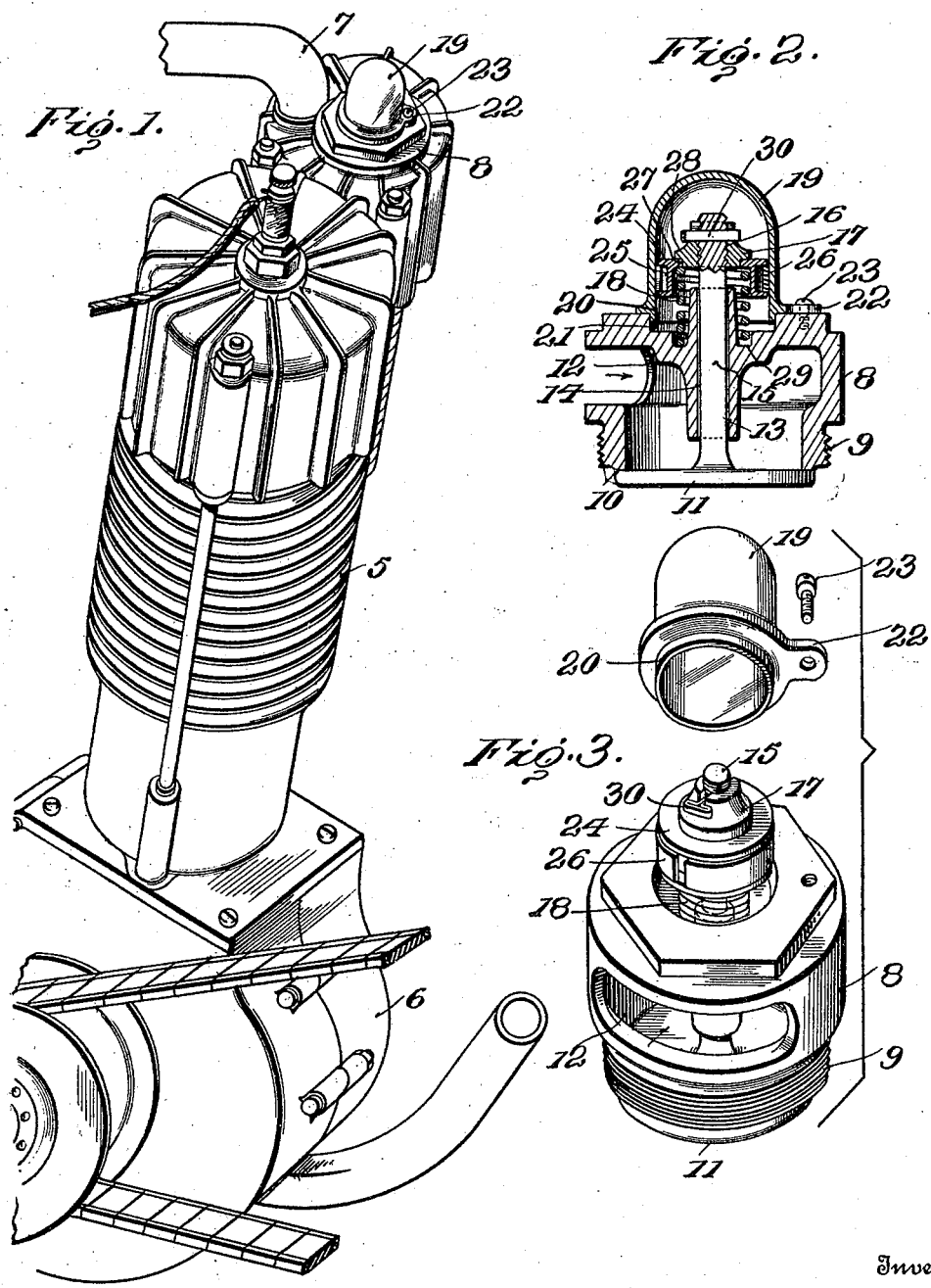

WILLIAM S. HARLEY, OF MILWAUKEE, WISCONSIN.

SILENCER FOR INTAKE-VALVES.

1,001,846.  Specification of Letters Patent.  Patented Aug. 29, 1911.

Application filed March 2, 1910. Serial No. 546,885.

*To all whom it may concern:*

Be it known that I, WILLIAM S. HARLEY, citizen of the United States, residing at Milwaukee, in the county of Milwaukee and State of Wisconsin, have invented certain new and useful Improvements in Silencers for Intake-Valves, of which the following is a specification.

This invention relates to internal combustion engines and more particularly to an automatic inlet valve especially designed for controlling the admission of fuel to a motorcycle engine.

The object of the invention is to provide means for retarding the closing movement of the inlet valve, thereby to prevent the latter from hammering on its seat and producing a disagreeable noise especially when the engine is running at a slow speed.

A further object is to provide an inlet valve movable to open position on the suction stroke of the piston and timed to close the fuel intake port at the end of the suction stroke of said piston.

A further object is to provide an inlet valve having a cap secured to the cage thereof and forming a housing for the valve stem and seating spring, there being a split ring surrounding the valve stem and bearing against the interior wall of the cap for retarding the closing movement of said valve.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a motorcycle engine provided with an inlet valve constructed in accordance with my invention; Fig. 2 is a vertical sectional view of the valve detached; Fig. 3 is a perspective view of the valve casing, the cap and fastening device being detached and shown in position above the valve cage.

Corresponding and like parts are referred to in the following description and indicated in all the views of the drawings by the same reference characters.

The improved silencer forming the subject matter of the present invention is especially designed for attachment to a motorcycle engine and by way of illustration is shown in connection with such an engine in which 5 designates the cylinder, 6 the crank casing and 7 the fuel intake.

The device comprises a casing or valve cage 8 having its exterior walls threaded at 9 and provided with a seat 10 for engagement with a valve 11, said casing being formed with an intake port 12, through which fuel is admitted to the interior of the cylinder 5. The cage 8 is formed with a centrally disposed cylindrical portion 13 having a vertically disposed bore 14 in which is slidably mounted a valve stem 15, the latter having its upper end threaded at 16 for engagement with a correspondingly threaded nut 17. Interposed between the lower face of the nut 17 and the top of the cage 8, is a coil spring 18 which serves to move the valve 11 to closed position after each charge of fuel is admitted to the cylinder. The valve casing or cage 8 is provided with a chamber formed by a cap 19 having a depending flange 20 which fits within an opening 21 formed in the cage 8 and serves to center the cap with respect to the stem 15. Extending laterally from the base of the cap is an attaching ear 22 having an opening formed therein which registers with a corresponding opening formed in the casing 8 to permit the insertion of a screw or similar fastening device 23 by means of which the cap may be retained in position on the cage.

Disposed within the chamber of the cap 19 and surrounding the valve stem 15, is a collar 24 having an annular groove 25 in which is seated a split ring 26, the latter being adapted to frictionally engage the interior wall of the cap 19 so as to retard the closing movement of the valve 11 and thus prevent the latter from hammering on its seat and producing a disagreeable noise when the engine is in operation. The upper end of the collar 24 is provided with an inwardly extending annular flange 27 which bears against a similar flange 28 formed on the lower face of the nut 17.

Attention is here called to the fact that one end of the coil spring 18 bears against the flange 27, while the other end thereof is seated in an annular groove 29 formed in the top of the valve casing or cage 8 so as to center the spring with respect to the valve stem 15 and at the same time exert an upward pressure on the flange 27 of the collar 24 and thus hold said collar in position on the nut 17.

The friction of the split ring 26 on the interior wall of the cap 19 is such as to prevent closing movement of the valve 11 until the piston has reached the end of its suction stroke.

The operation of the device is as follows: On the suction stroke of the piston, the inlet valve 11 is moved to open position against the tension of the spring 18 so as to admit fuel through the port 12 to the interior of the cylinder. When the valve is in open position, an equal pressure will be exerted on both sides of the valve and hence the spring 18 will tend to close the valve. The action of the spring 18 however, is retarded by the friction of the ring 26 upon the interior wall of the cap 19 and before the spring 18 completely overcomes the friction between the ring 26 and cap 19, the piston will have reached the end of its suction stroke. In this manner, the valve 11 is prevented from closing on its seat 10 until the piston ceases to draw in air and gas, or in other words, until the direction of movement of the piston is reversed at the end of its suction stroke. If, for any reason, the friction between the split ring 26 and interior wall of the cap 19, causes the valve to close too slowly, the pressure of the gas in the cylinder on the compression stroke of the piston will automatically close said valve and thus prevent a charge of gas in the cylinder from being blown back through the carbureter. It is to be understood however, that the tension of the split ring 26 will be adjusted so as to exert only enough friction on the interior wall of the cap 19 to effect the gradual closing of the valve 11 and to cause said valve to seat itself at the end of the suction stroke of the piston.

A split key or other fastening device 30 preferably pierces the nut 15 and valve stem for preventing rotation of one relatively to the other.

While the device is principally designed for use on inlet valves, it will of course be understood that the same may be used with equally good results on exhaust valves or wherever a device of this character is found desirable and applicable.

Having thus described the invention, what is claimed as new is:

1. In an explosive engine, a valve casing having a chamber, an inlet valve having a stem extending within said chamber, a stop carried by the stem, a collar loosely mounted on the stem and bearing against the stop, a spring disposed within said chamber and interposed between the collar and valve casing for yieldably supporting the collar in engagement with the stop and normally and yieldably holding the valve to its seat, and a split ring carried by the collar and adapted to frictionally engage the interior wall of the chamber for retarding the closing movement of said valve.

2. In an explosive engine, a valve casing, a cap detachably secured to the casing, an inlet valve having a stem extending within the cap, an adjustable stop mounted on the stem, a loose collar bearing against the face of the stop, a spring interposed between the collar and casing for closing the valve and yieldably supporting the collar in engagement with the stop, and a split ring carried by the collar and adapted to frictionally engage the interior wall of the cap for retarding the closing movement of the valve, said stop serving to adjust the tension of the spring.

3. In an explosive engine, a valve casing, a cap secured to the casing, an inlet valve having a stem extending within the cap, a stop carried by said stem and provided with a laterally extending flange, a collar surrounding the stem and bearing against the flange of the stop, a spring bearing against the collar and casing respectively, for retarding the closing movement of the valve, and a split ring seated in the collar and adapted to frictionally engage the interior wall of the cap for retarding the closing movement of the valve.

4. In an explosive engine, a valve casing having an inlet port, a cap detachably secured to the casing, an inlet valve having a stem extending within the cap, an adjustable stop carried by the valve stem, a loose collar yieldably supported in engagement with the bottom of said stop and provided with a circumferential groove, a spring having its upper end housed within the collar and its lower end bearing against the casing for normally closing the valve, and a split ring seated in the groove of the collar and adapted to frictionally engage the interior wall of the cap for retarding the closing movement of the valve.

5. In an explosive engine, a casing having a port and provided with an annular seating recess, a cap having a depending flange engaging the interior wall of the seating recess and provided with a laterally extending lug for attachment to the casing, a valve having a stem extending within the cap, a stop nut threaded on the valve stem and provided with a laterally extending flange, a grooved collar surrounding the stem and provided with an inwardly extending flange bearing against the flange of the stop nut, there being a seating groove formed in the bottom of said recess, a spring having one end thereof engaging the seating groove and its other end bearing against the flange of the collar for automatically closing the valve, and a split ring seated in the groove of the collar and bearing against the interior wall of the cap for retarding the closing movement of the valve.

6. In an explosive engine, a casing communicating with the interior of the engine cylinder and provided with a chamber, a valve seated in the casing and movable to open position by the suction of the piston, means disposed within the chamber for yieldably holding the valve to its seat, and retarding means operating within said chamber and acting in opposition to the valve closing means for causing a gradual closing movement of the valve, said retarding means being retained in position on the valve by the valve seating means.

In testimony whereof I affix my signature in presence of two witnesses.

WILLIAM S. HARLEY. [L. S.]

Witnesses:
 WALTER DAVIDSON,
 ALB. E. BECKER.

Copies of this patent may be obtained for five cents each, by addressing the "Commissioner of Patents, Washington, D. C."